«12» United States Patent
Plant

(10) Patent No.: US 8,005,301 B2
(45) Date of Patent: Aug. 23, 2011

(54) METHOD OF DIFFERENCE SENSING THROUGH OPTICAL COHERENT CHANGE DETECTION

(75) Inventor: James R. Plant, Victoria (CA)

(73) Assignee: Q5 Innovations Inc., British Columbia (CA)

( * ) Notice: Subject to any disclaimer, the term of this patent is extended or adjusted under 35 U.S.C. 154(b) by 964 days.

(21) Appl. No.: 11/843,746

(22) Filed: Aug. 23, 2007

(65) Prior Publication Data

US 2008/0050021 A1 Feb. 28, 2008

Related U.S. Application Data

(60) Provisional application No. 60/840,361, filed on Aug. 25, 2006.

(51) Int. Cl.
*G06K 9/62* (2006.01)
(52) U.S. Cl. ........ 382/209; 348/169; 382/103; 382/261; 382/275; 382/294
(58) Field of Classification Search ............ 348/96, 348/169, 173, 266, 366, 268, 578; 382/103, 382/107, 209, 210, 278, 284, 294, 261, 275
See application file for complete search history.

(56) References Cited

U.S. PATENT DOCUMENTS

| 4,675,532 | A  | * | 6/1987  | Carson ........................ 348/294 |
| 5,619,596 | A  | * | 4/1997  | Iwaki et al. ................... 382/278 |
| 6,580,466 | B2 | * | 6/2003  | Siefken ......................... 348/700 |
| 6,697,109 | B1 | * | 2/2004  | Daly ............................ 348/268 |
| 6,781,620 | B1 | * | 8/2004  | Keyes ............................ 348/96 |
| 7,315,324 | B2 | * | 1/2008  | Cleveland et al. ......... 348/208.4 |
| 7,483,551 | B2 | * | 1/2009  | Chen ............................ 382/107 |
| 2002/0076117 | A1 | * | 6/2002 | Allred et al. .................. 382/261 |
| 2003/0016882 | A1 | * | 1/2003 | Riley et al. ................... 382/275 |
| 2004/0071367 | A1 | * | 4/2004 | Irani et al. .................... 382/284 |
| 2004/0179108 | A1 | * | 9/2004 | Sorek et al. ................ 348/216.1 |
| 2006/0071944 | A1 | * | 4/2006 | Matsumoto et al. ......... 345/622 |
| 2006/0269155 | A1 | * | 11/2006 | Tener et al. .................. 382/243 |
| 2008/0050021 | A1 | * | 2/2008 | Plant ............................ 382/209 |

* cited by examiner

Primary Examiner — Gregory M Desire
(74) Attorney, Agent, or Firm — Davis & Bujold, P.L.L.C.

(57) ABSTRACT

A method of difference sensing. A first step involves producing a reference image using temporal averaging and spatial averaging. A second step involves producing a test image. A third step involves computationally comparing the reference image with the test image to arrive at a resulting difference image. The temporal averaging and spatial averaging effectively isolates in the difference image coherent changes imbeded in a complex and rapidly changing environment from transient changes inherent to the complex and rapidly changing environment.

11 Claims, 5 Drawing Sheets

METHOD OF DIFFERENCE SENSING THROUGH OPTICAL COHERENT CHANGE DETECTION

FIELD

The present invention relates to a method of difference sensing through optical coherent change detection.

BACKGROUND

Difference imaging, in its simplest form, is carried out by talking two separate images of the same object or scene with each image being separated by a certain duration of time (the reference and test images). When the two images or brought into spatial alignment, and the values of the individual pixels of one image is computationally compared with the other image (usually by subtraction), the result is a "difference image" where the pixel values quantify (and spatially map) the magnitude of change that has occurred in the scene during the interval between the two samples.

SUMMARY

According there is provided a method of difference sensing. A first step involves producing a reference image using temporal averaging and spatial averaging. A second step involves producing a test image. A third step involves computationally comparing the reference image with the test image to arrive at a resulting difference image. The temporal averaging and spatial averaging effectively isolates in the difference image coherent changes imbeded in a complex and rapidly changing environment from transient changes inherent to the complex and rapidly changing environment.

BRIEF DESCRIPTION OF THE DRAWINGS

These and other features of the invention will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION

Figure 1:
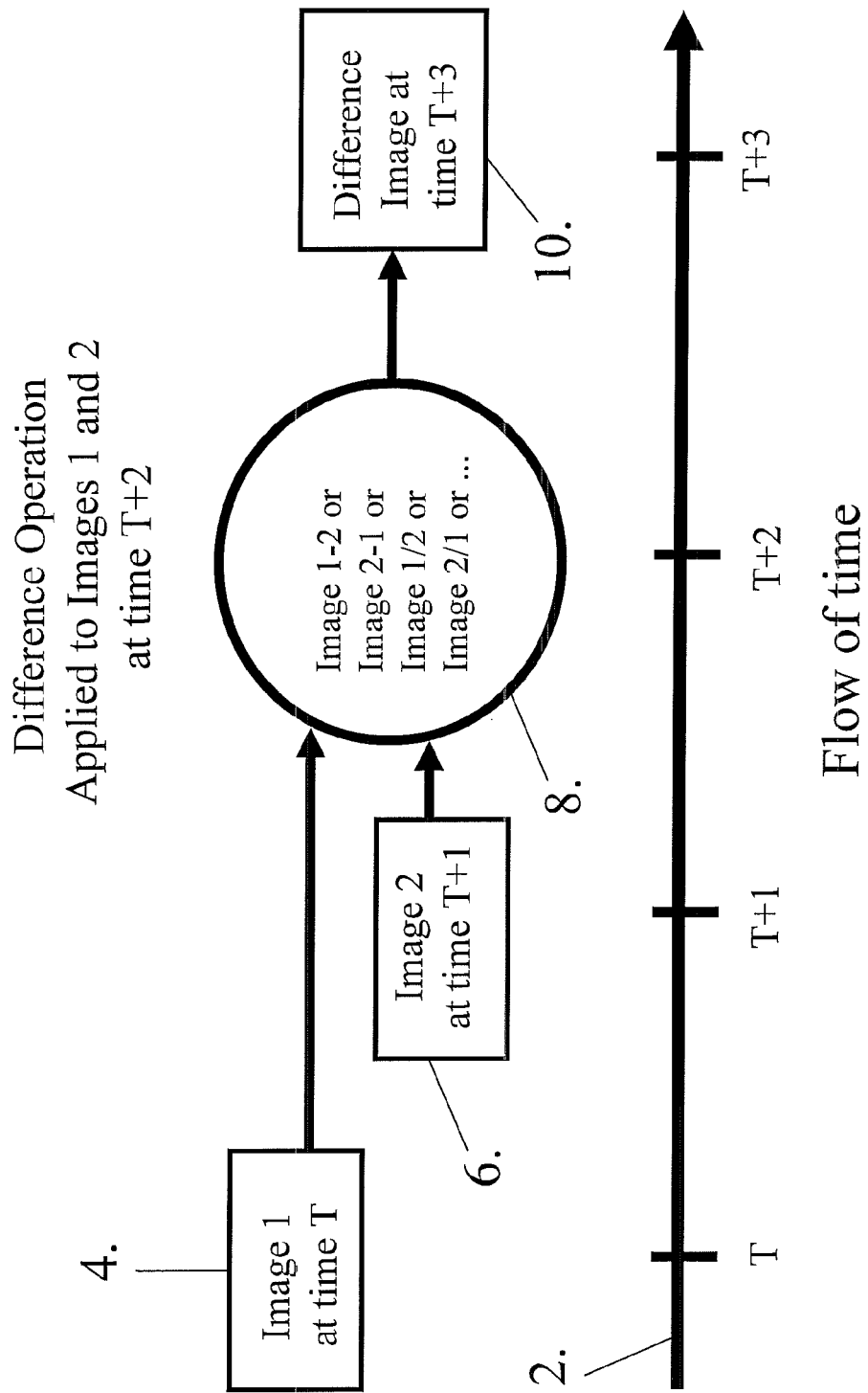
FIG. 1 labelled as PRIOR ART is a time line relating to processes in time leading to creation of difference images.

Difference imaging, in its simplest form, is carried out by taking two separate images of the same object or scene with each image being separated by a certain duration of time (the reference and test images). When the two images or brought into spatial alignment, and the values of the individual pixels of one image are subtracted from the other image (or otherwise computationally compared with the other image), the result is a "difference image" where the pixel values quantify (and spatially map) the magnitude of change that has occurred in the scene during the interval between the two samples. FIG. 1 illustrates the relationship of various processes in time, which leads to the creation of typical different images. Different images can be produced using any form of imaging technology (for example, either chemical or digital photographic methods), therefore this figure is meant only to illustrate the salient features or processes underlying the creation of any typical or traditional difference images. Object 2 represents the flow of time, from arbitrary time T (the beginning of the difference imaging process) to time T+3 (the production of the final difference image). Object 4 represents the first image taken at time T. this is a completely exposed image covering a specific field of view. At time T+1 a second such image of the same field of view is taken (object 6). At time T+2, images 1 and 2 are spatially aligned, and a difference operation is applied (such as subtracting or ratioing the intensity value at one spatial location in image 1 from the corresponding spatial location in image 2). The result of this operation leads to the creation of a difference image (object 10 at time T+3) which highlights spatial variations in pixel intensity between the two initial images (objects 4 and 6) over time. The rate at which future reference frames are subsequently generated is dependent on the extent and rate of average change in the environment.

While difference imaging are extremely sensitive for detecting even the smallest changes which have occurred over time, this same sensitivity results in significant signal noise due to also highlighting random variations. At present, the utility of this technique is therefore limited when dealing with complex or natural settings, due to the presence of random temporal variations within the scenes. For example, in an image taken in a setting with grass and trees being gently blown by wind, complex and subtle variations in the positioning of leaves or blades of grass will result in the generation of a large random signal in the difference image. Likewise, the appearance of any transient object in either of the two images will result in a large difference image signal. Under these conditions, areas with changing pedestrian or vehicular traffic effectively render the technique of difference imaging useless for security applications.

It is to be noted that while the prior art speaks to polarization difference imaging (PDI), the present application speaks to polarization difference sensing (PDS). The technology that will be hereinafter described can be used in a variety of other applications such as RADAR and LIDAR. For the purpose of this discussion, PDI is considered to be a subset of PDS, which results in the creation of visual images.

In the present patent, we describe a concept and technique of difference imaging created through a process, which we have named Optical Coherent Change Detection (OCCD). While the present patent focuses on the utility of this new technique using visible, near infrared or ultraviolet wavelengths of light, this process may be applied to any wavelength in the electromagnetic spectrum, and can be carried out by utilizing either reflected, emitted or transmitted stimuli.

In its simplest form, OCCD utilizes temporal averaging of the imaging input to create both the reference and test images used to produce the final difference image. Temporal averaging of an image can be carried out by a number of methods. For example, one may decrease the amount of light falling on the sensor during a given period of time by inserting an optical component such as a neutral density filter in the stimulus pathway. By limiting the intensity of the input, the time required to gain adequate exposure required for image formation is increased. A second approach is to increase the rate at which data is read off of digital imaging chips (so a full exposure time is never achieved), and then to digitally combine these pixel values in such a way that they come to a normal exposure level.

Both of the above techniques result in what has traditionally been known as a "time-lapse photograph". Time-lapse photographs have a unique characteristic in that any temporal variation or movement (over a time scale significantly shorter than the exposure time) is effectively averaged out. The resulting image is a temporal average of spatial variability within the image. With appropriately chosen exposure times, pedestrian and vehicular traffic, as well as the natural movement of leaves, grasses and their resultant shadows effectively vanish from the image. As a result, only significant changes that have occurred in the environment during the interval between the reference and test images are highlighted in the difference images. These changes can be detected in the background even through intervening traffic. Consequently, OCCD allows for the rapid video detection, spatial localization and identification of any object (such as an explosive device) dropped in a complex and constantly changing security environment.

Figure 2:
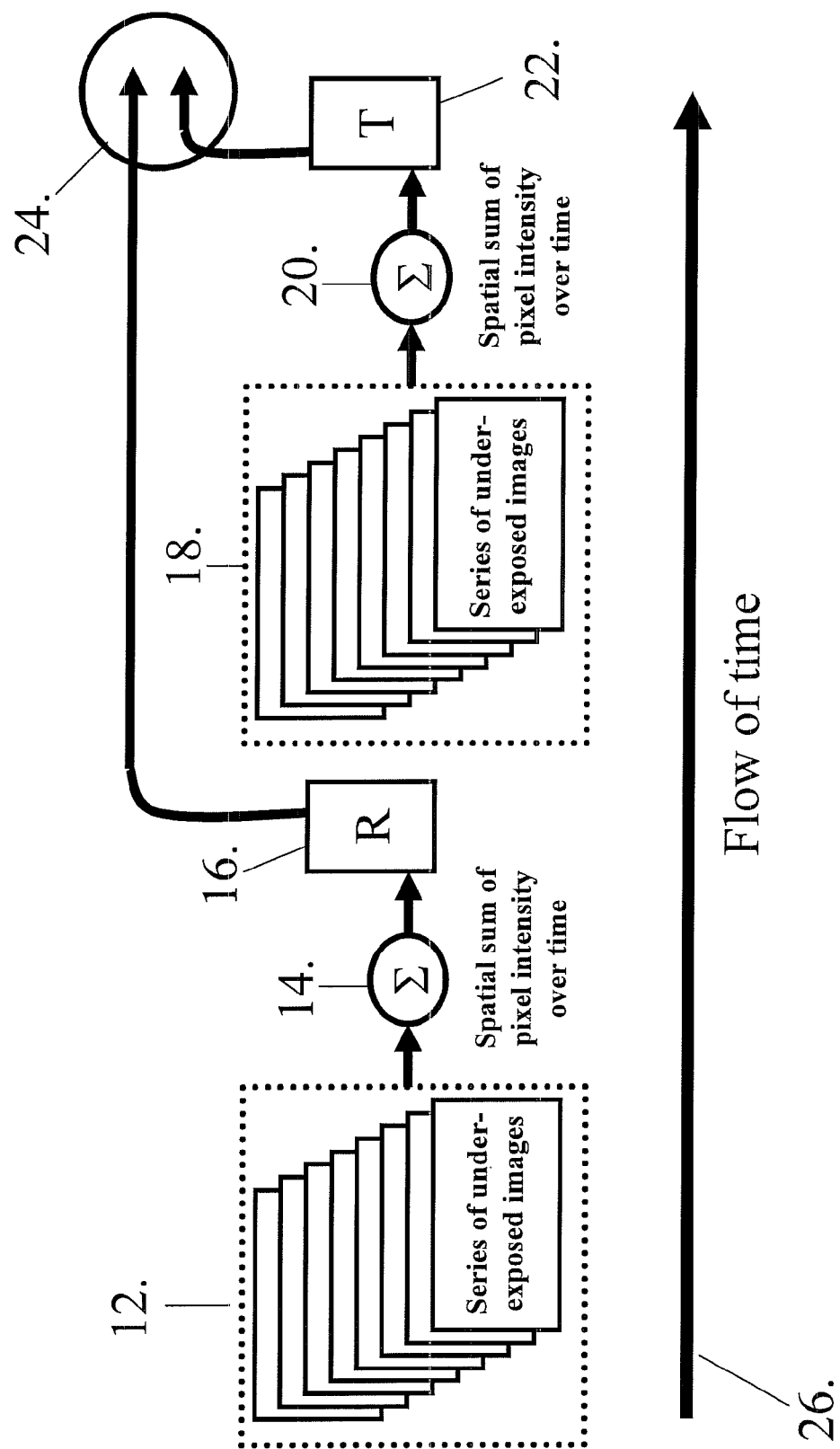
FIG. 2 is a time line relating to processes in time leading to creation of an optical coherent change detection image.

FIG. 2 illustrates the underlying processes mediating the creation of an Optical Coherent Change Detection (OCCD) image. There are two operationally different (yet conceptually identical) methods for producing an OCCD image. First, a series of underexposed images of the same scene are collected (object 12), they are spatially aligned, and their corresponding pixel values are summed (object 14) to create a temporal average ("time-lapse") of pixel intensity over space (object 16). After an interval of time, a second series of images (object 18) are collected, and a summed (object 20) to create a second "time-lapse" image (object 22). The first image (object 16) is used as a reference image (as designated by the capital letter R), and along with the second image (object 22: the test image "T"), are processed to create a difference image (object 24) which highlights coherent changes in the scene which have occurred during the intervening time between the reference and test images. A second method for obtaining the reference and test images required to calculate an OCCD image is characterized by decreasing the amount of light falling on the detector (such as through the use of neutral density filters), and then allowing for sufficient time to form an adequately exposed image at the level of the detector. This process is repeated again later in time to form the test image, and is processed as outlined above to create the final OCCD image.

OCCD has applications in areas as diverse as security and military, medical and dental imaging, and engineering or structural assessment. Each field of application will determine both the time of exposure for both the reference and test images, as well as determining the most effective time interval required between the two images used to create the difference image. For example, in a complex and changing environment such as the subway station, difference images computed from reference and test images taken with a 30 second interval would guarantee prompt detection and a rapid response to parcels dropped in the environment. In the case of an OCCD surveillance system being used to secure a shipping yard or warehouse, an interval of five minutes between the reference and test images would be sufficient. In medical applications (such as x-rays), the interval between successive reference and test images could be more than a year. The longer the interval between the reference and test image, the more critical it is to obtain proper spatial registration between these two images used to create the difference image.

Figure 3:
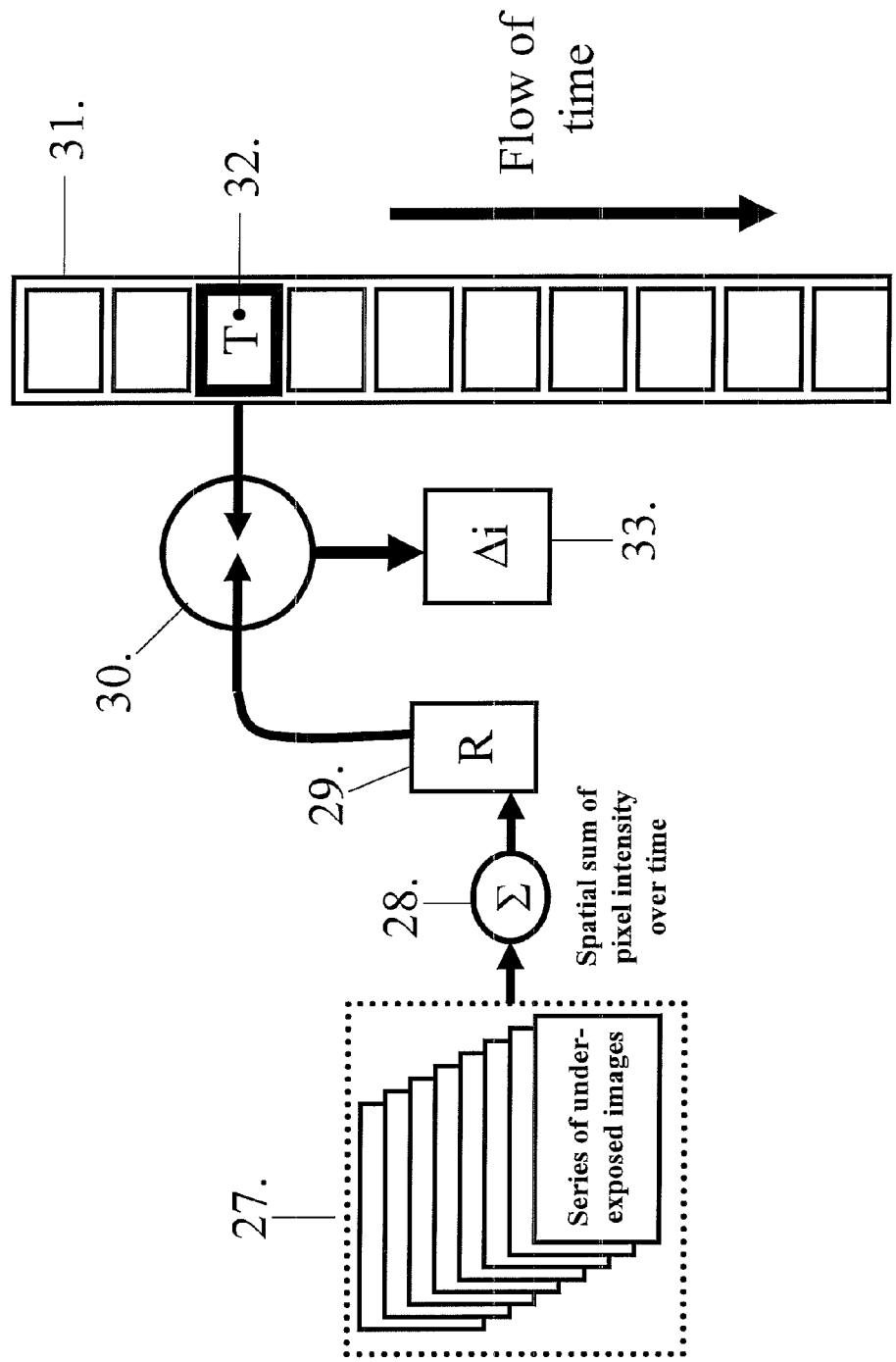
FIG. 3 is a time sequence diagram regarding producing an optical coherent change detection image through subtraction of stationary background objects in a video sequence.

Our underlying OCCD process can be applied in a variety of unique ways that would have been impossible with earlier difference imaging techniques. For example, in FIG. 3, a "time-lapse" reference image (object 29) can be created (as outlined in FIG. 2) to which a sequence of video frames (object 31) can be compared (object 30) to create a temporally succinct OCCD image. As a result, all stationery background objects in the video sequence will be subtracted from each individual frame (such as object 32), effectively isolating only moving and significantly changeable aspects contained within the otherwise potentially complex and cluttered video stream.

Figure 4:
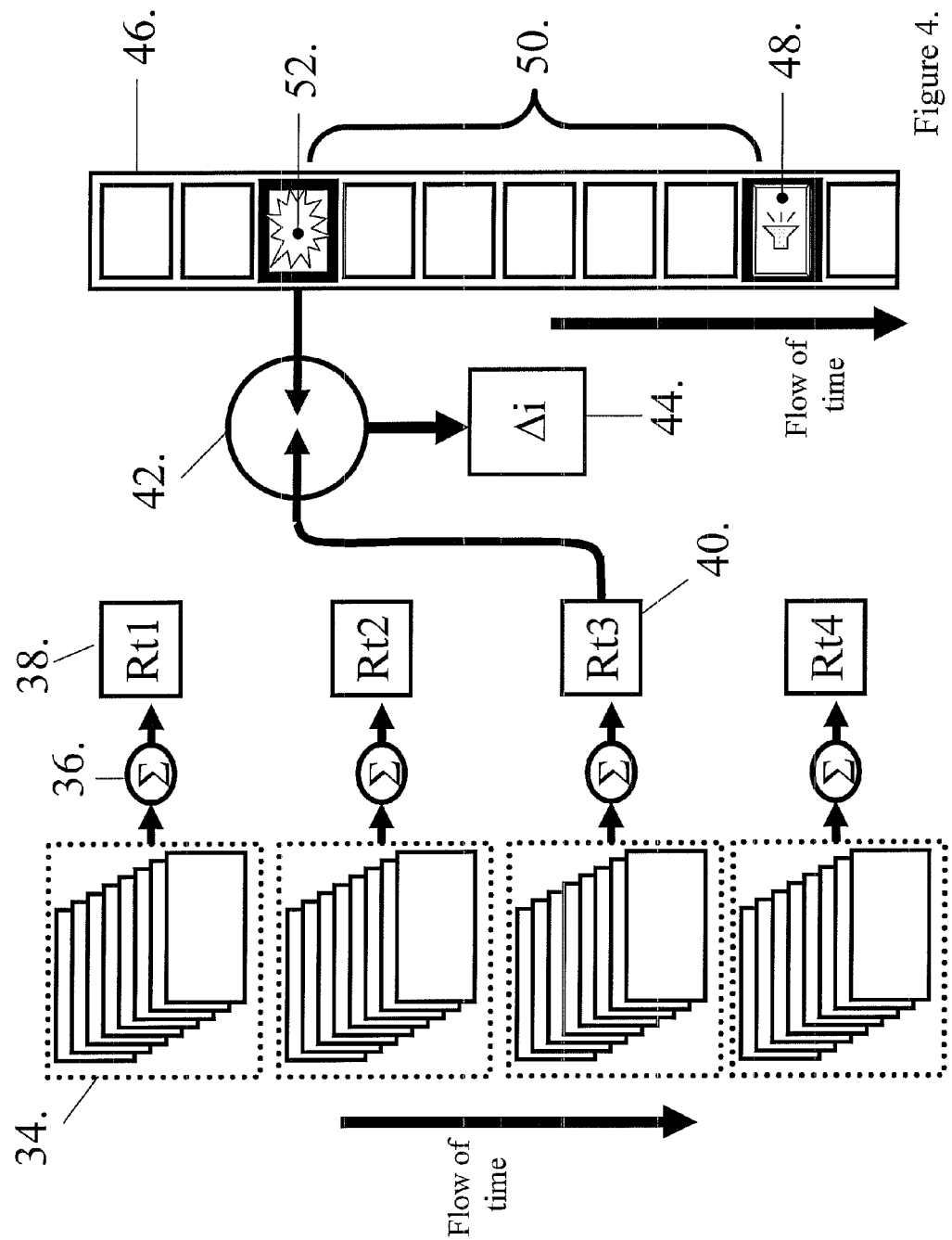
FIG. 4 is a time sequence diagram regarding using an optical coherent change detection image for the purpose of locating snipers.

The ability to localize and identify significant changes in a complex and variable environment can be greatly enhanced through multi-sensor fusion. For example, when combined with acoustic signal processing techniques, OCCD can be integrated into it an efficient system for detecting and spatially localizing the presence of a sniper or enemy fire in a complex combat or urban setting. For example, FIG. 4 illustrates that if a microphone is used to detect the occurrence of gunfire (such as a sniper), the recorded gunfire (object 48) will be displaced in time (object 50) by a period of time dependent on the distance to the sniper and the speed of sound. As such, the video frame containing the image of the sniper and the muzzle blast (object 52) will occur earlier on the video recording (object 46). To detect the exact spatial location and time of the sniper fire a continuous series of reference frames (e.g. boxes Rt1—Rt4) are computed and the last reference frame computed before the recorded gunfire (object 40) or earlier are used to compute a frame by frame series of difference images. When the video frame containing the muzzle flash is encountered (object 52) and included in the calculation of the difference image (object 42), the precise temporal and spatial location of the sniper can be isolated in the resultant OCCD image (object 44) regardless of the complexity of the surroundings.

Regions where changes have occurred in OCCD images typically give rise to very large changes in the pixel values. For example, the sudden appearance of an object may result in a maximum local pixel value (e.g. an 8-bit pixel value of 255). Since such extreme pixel values are rarely seen in a correctly exposed image, a spatial clustering of such values can be used to (A) trigger an alarm to draw the attention of the system operator to the occurrence of a significant change, or (B) be used to compute a spatial reference within a coordinate system that can be used to automatically drive other security cameras to focus in on the potentially dangerous object in the security setting.

Figure 5:
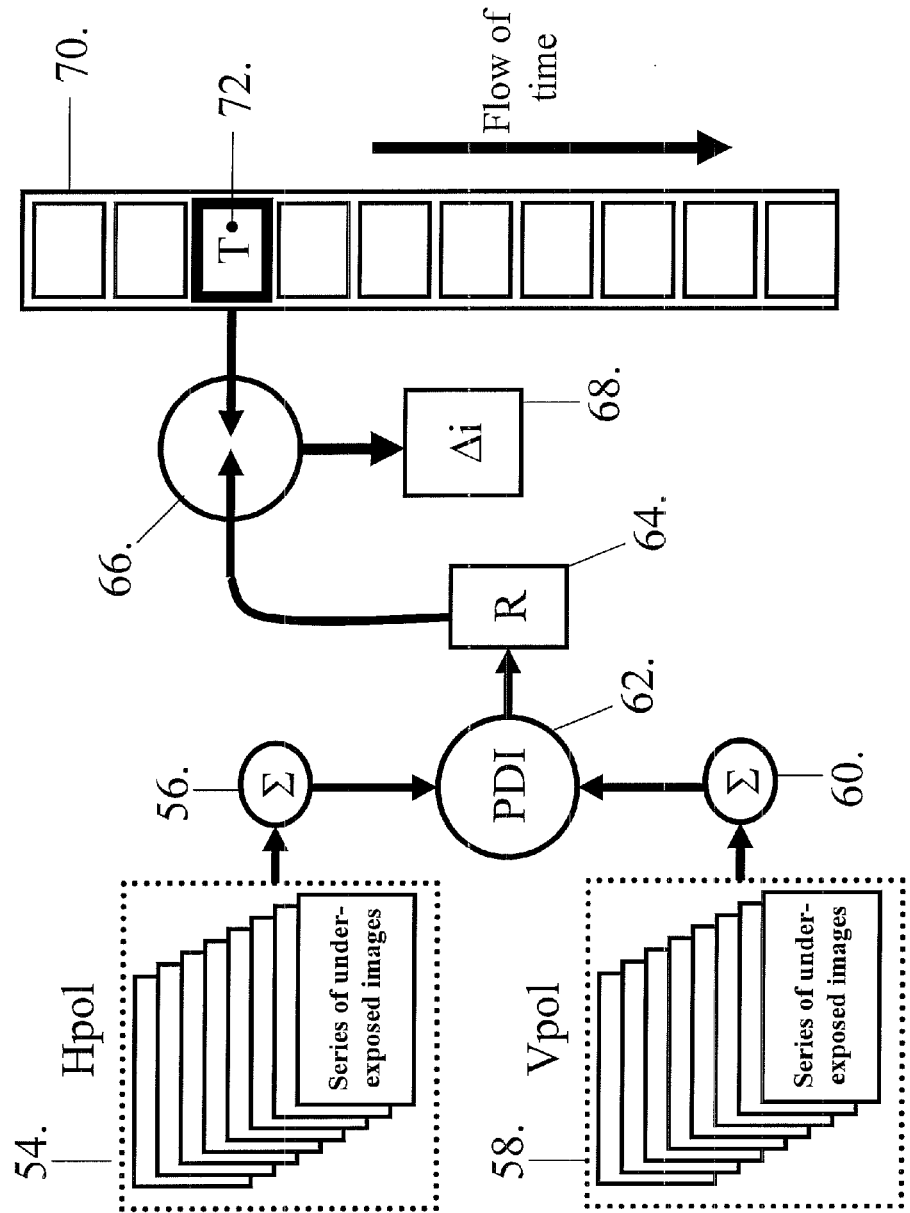
FIG. 5 is a time sequence diagram regarding combining optical coherent change detection image processing with real-time polarization difference imaging.

The OCCD process can be further enhanced through integration with the real-time polarization difference imaging (PDI) technique. In FIG. 5, a series of frames (object 54) are imaged utilizing optics which isolate the horizontally polarized components (indicated by Hpol) within the image frame. Likewise, a series of frames (object 58) are imaged utilizing optics which isolate the vertically polarized components (indicated by Vpol) within the image frame. Both the Hpol and the Vpol underexposed frames are summed (object 56 and object 60 respectively), and are used to compute a PDI image (object 62) which subsequently becomes the reference image (object 64) to be used in the computation (object 66) of the OCCD image (object 68). In this case, the test image (object 72) is a frame from a real-time PDI video series (object 70).

Within the security context, a strong polarmetric signature also helps to reduce false alarms by highlighting the presence of artificial structures in a natural environment. In addition, periodic computing of an OCCD difference image will enable the operator of such a security system to detect the approach of an assailant regardless of how well they are camouflaged to blend into their surroundings, or how slow and steady their approach may be. While normal security video systems cannot easily distinguish between a camouflaged intruder and natural foliage, a security surveillance system based on our OCCD technology will easily detect such an intruder.

When combined with Polarization Difference Imaging (PDI) techniques, OCCD becomes particularly effective at detecting and documenting structural changes (such as component deformation) caused by excessive compressive, torsional or shearing forces even when such the deformations are so subtle as to not be visually detectable, or detectable by traditional video survey techniques. For example, during underwater inspection of offshore oil well structures, variations in the presence of illuminated particles in the two frames taken during a traditional difference image would create a tremendous amount of image noise. With our paired PDI/OCCD system, not only are variations of particle distributions averaged out, but also the PDI process greatly enhances imaging ability through turbid waters. Further applications of such an imaging system include the detection of icing conditions in aviation. For example, during icing conditions the polarmetric signature of light reflected off in metal wing or structure undergoes a significant change, as the ice creates an optically scattering coating (thereby disrupting the polarization signature). PDI video, in combination with OCCD imaging techniques, can be utilized to create a system for determining the spatial location, rate and extent of ice formation on aircraft or other structures. Through the use of a time series of PDI/OCCD images taken of flight surfaces of an aircraft, the extent and rate of ice formation, as well as the efficiency of de-icing techniques can be readily determined either on the ground or during flight.

When combined with acoustic signal processing techniques, OCCD can be integrated into an efficient system for detecting and spatially localizing the presence of a sniper in a complex combat or urban setting. In this case, a 360° OCCD reference frame is computed and stored in such a way as to maintain a complete temporal record over a predefined period. When the presence of a gunshot is detected utilizing the acoustic signal processor (at time=T+0), a series of individual video frames (taken from seconds before until after the recorded gunshot) are sequentially subtracted from the last OCCD reference image. As a result, the appearance of the muzzle flash, smoke, and movement of the sniper can be rapidly spatially localized.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the claims.

What is claimed is:

1. A method of difference sensing, the method comprising the steps of:
    producing a reference image using temporal averaging and spatial averaging, the temporal averaging and spatial averaging comprising taking a series of images of the same scene, spatially aligning the series of images, and then summing corresponding pixel values of the series of images to create a temporal average of pixel intensity;
    producing a test image;
    computationally comparing the reference image with the test image to arrive at a resulting difference image, such that the temporal averaging and spatial averaging effectively isolates in the difference image coherent changes imbedded in a complex and rapidly changing environment from transient changes inherent to the complex and rapidly changing environment.

2. The method of claim 1, the test image being produced using temporal averaging and spatial averaging.

3. The method of claim 1, computationally comparing involving subtracting the reference image from the test image.

4. The method of claim 1, the temporal averaging being within a specific time frame.

5. The method of claim 4, the spatial averaging involving a spatial sum of pixel intensity over the specified time frame.

6. The method of claim 1, background being deducted from the difference image to reduce computational detection load.

7. The method of claim 1, the reference image being saved at periodic intervals for subsequent chronological referencing.

8. The method of claim 1, the reference image being produced from a series of under exposed images.

9. The method of claim 1, including a step of producing the reference image and the test image utilizing polarization difference imaging.

10. The method of claim 1, including a step of coordinating more than one sensor modality.

11. The method of claim 10, the more than one sensor modality being an image sensor and an auditory sensor.

* * * * *